(12) United States Patent
Ogino et al.

(10) Patent No.: US 6,999,776 B2
(45) Date of Patent: Feb. 14, 2006

(54) MOBILE STATION HAVING INDOOR/OUTDOOR MODE SHIFTING FUNCTION

(75) Inventors: Hiroyasu Ogino, Okazaki (JP); Michio Shamoto, Niwa-gun (JP); Toshihiro Takeuchi, Tokoname (JP); Atsushi Hayashida, Kariya (JP); Kyoji Oda, Gamagori (JP); Tatsuya Shintai, Chita-gun (JP)

(73) Assignee: Denso Corporation, Kariya (JP)

( * ) Notice: Subject to any disclaimer, the term of this patent is extended or adjusted under 35 U.S.C. 154(b) by 398 days.

(21) Appl. No.: 10/230,346

(22) Filed: Aug. 29, 2002

(65) Prior Publication Data
US 2003/0050089 A1   Mar. 13, 2003

(30) Foreign Application Priority Data
Sep. 13, 2001 (JP) .............................. 2001-278328

(51) Int. Cl.
*H04Q 7/20* (2006.01)
*H04B 1/38* (2006.01)
*H04M 1/00* (2006.01)

(52) U.S. Cl. ................ 455/456; 455/456.1; 455/552.1; 455/553.1; 342/357.1

(58) Field of Classification Search ............ 455/67.11, 455/552.1, 456.1, 456.6, 553.1; 342/357.1, 342/357.12
See application file for complete search history.

(56) References Cited

U.S. PATENT DOCUMENTS

| 5,479,476 | A  | * | 12/1995 | Finke-Anlauff ............. 455/566 |
| 5,936,572 | A  | * | 8/1999  | Loomis et al. .............. 342/457 |
| 6,313,786 | B1 | * | 11/2001 | Sheynblat et al. ..... 342/357.02 |
| 6,459,989 | B1 | * | 10/2002 | Kirkpatrick et al. ........ 701/215 |

FOREIGN PATENT DOCUMENTS

| JP | A-5-18767   | 1/1993  |
| JP | A-6-148308  | 5/1994  |
| JP | A 6-315005  | 11/1994 |
| JP | A-8-265107  | 10/1996 |
| JP | A-10-276477 | 10/1998 |
| JP | A 2000-098018 | 4/2000 |
| JP | A-2000-312376 | 11/2000 |

* cited by examiner

*Primary Examiner*—Simon Nguyen
(74) *Attorney, Agent, or Firm*—Oliff & Berridge, PLC

(57) ABSTRACT

In a mobile station, a period for receiving a GPS signal from a predetermined satellite based on data for satellite reception is set up by a timer, and the GPS signal whose reception level is higher than a threshold value is awaited. Until elapsed time reaches a preset time, indoor counter is incremented if the GPS signal is unable to be received or outdoor counter is incremented if the GPS signal is able to be received. When each counter reaches a specified value, each mode is determined. If the mode is different from a previous mode, a mode shift is executed and setups of user interfaces, display, speaker and others, are altered for the updated mode, indoor or outdoor.

12 Claims, 3 Drawing Sheets

US 6,999,776 B2

MOBILE STATION HAVING INDOOR/OUTDOOR MODE SHIFTING FUNCTION

CROSS REFERENCE TO RELATED APPLICATION

This application is based on and incorporates herein by reference Japanese Patent Application No. 2001-278328 filed on Sep. 13, 2001.

FIELD OF THE INVENTION

The present invention relates to a mobile station such as a cellular phone or a mobile device, which communicates through wireless line with a base station and is capable of controlling a user interface depending on its own location by an indoor/outdoor mode shifting function.

BACKGROUND OF THE INVENTION

In a mobile station such as a cellular phone, user interfaces of a display image, speaker volume and others are not changed automatically, but changed by users on a case-by-case basis depending on usage situation. Thereby, display image, whose display contrast is previously set up in indoor usage, is not easily viewed in bright-lighted outdoor usage.

SUMMARY OF THE INVENTION

The present invention solves the above problem and enables a mobile station to automatically select a user interface suitable for usage locations, namely indoors or outdoors.

In order to perform the above, the mobile station not only communicates with a base station forming a communication network, but also receives a Global Positioning System (GPS) signal. When reception strength of the GPS signal is higher than a threshold, presence of the GPS signal is determined and the mobile station is operated in an outdoor mode. Inversely, when the presence of the GPS signal is not determined, namely absence of the GPS signal is determined, within a preset period, the mobile station is operated in an indoor mode. Determination of the mode, indoor or outdoor, only requires at least a GPS signal, so that the mobile station determines the mode so quickly to control the user interface.

The mode is determined by an indoor or outdoor counter periodically when the presence or absence is continuously determined. Also, since continuity of the presence or absence of the GPS signal is observed by using the counters, the mode may not shift until usage condition becomes stable.

BRIEF DESCRIPTION OF THE DRAWINGS

The above and other objects, features and advantages of the present invention, will become more apparent from the following detailed description made with reference to the accompanying drawings. In the drawings.

DETAILED DESCRIPTION OF THE PREFERRED EMBODIMENTS

Figure 1:
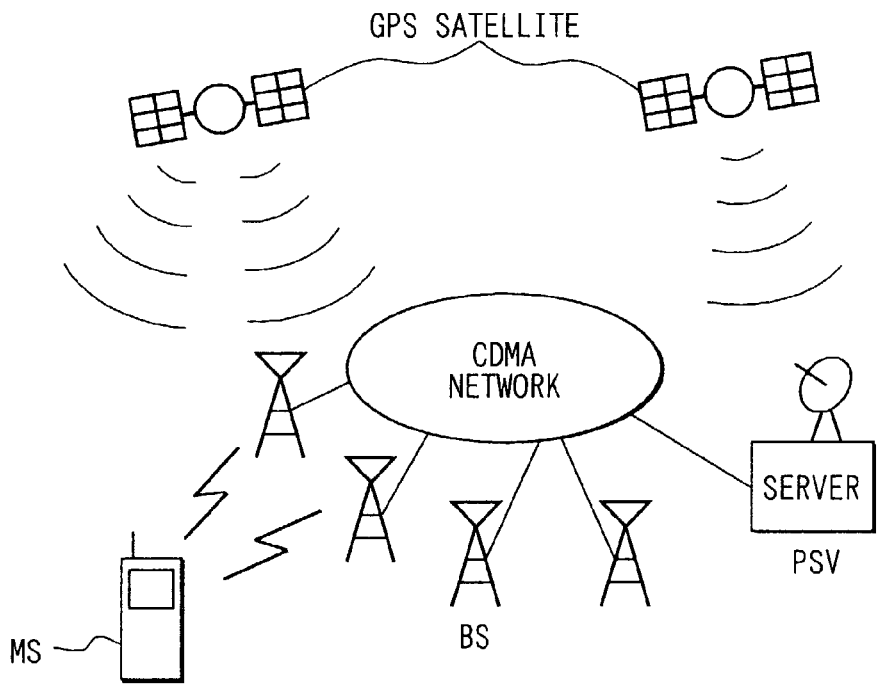
FIG. 1 is a schematic diagram illustrating a communication system.

FIG. 1 shows an overview of the Code Division Multiple Access (CDMA) network including a mobile station MS of an embodiment of the present invention. The mobile station MS communicates with a base station BS connecting to the CDMA network. A positioning server PSV is also included in the CDMA network and specializes in computing a location (location computing) of the mobile station MS with using necessary information sent from the mobile station MS. The base station BS and the positioning server PSV receive signals from Global Positioning System (GPS) satellites and their system clocks are synchronized to the GPS signal. Moreover, the mobile station MS is capable of receiving the GPS signals which is to be sent via network to the positioning server PSV as the information necessary for the location computing.

Here, the above location computing of the mobile station is explained. For the location computing, GPS signals from at least four satellites are used in an outdoor location where a plurality of the GPS satellites are searched. Meanwhile, apparent signal delays from base stations BS with using station communication functions are used to compute in an indoor or other location where the GPS satellite is not able to be searched. The location computing requires complicated algorithm based on the almanac information regarding the GPS satellites previously memorized, multiple base station BS information, and signals measured by the mobile station MS. Accordingly, the mobile station MS only collects and sends out the information necessary for the location computing while the positioning server PSV executes the complicated location computing and then sends the location of the computing result to the mobile station MS.

Figure 2:
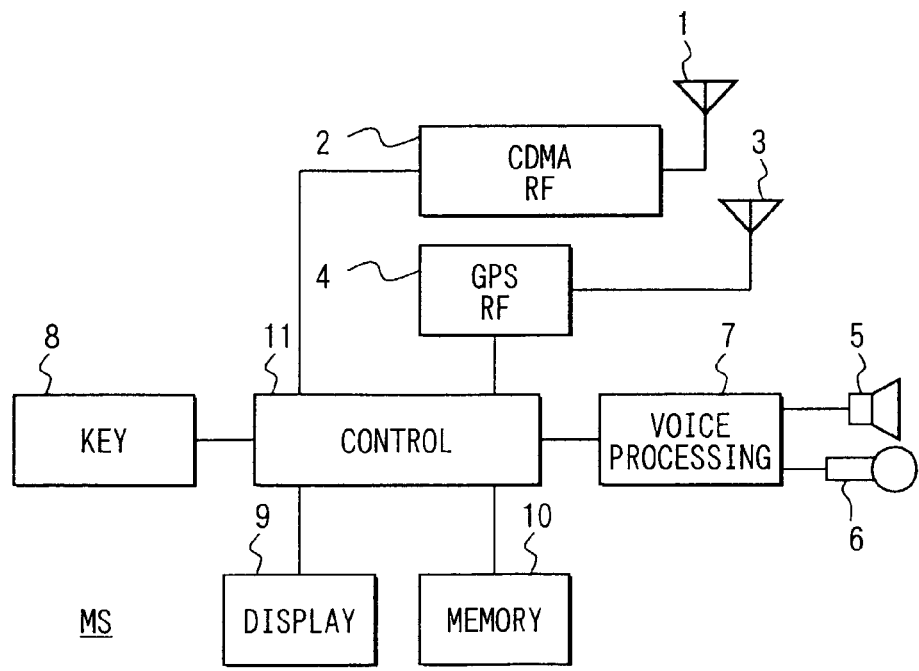
FIG. 2 is a structural block diagram illustrating a mobile station according to an embodiment of the present invention.

Referring to FIG. 2, the mobile station MS includes a CDMA antenna 1 and a CDMA radio frequency (RF) section 2 for communicating with the base station BS, and a GPS antenna 3 and a GPS RF section 4 for receiving the signals from GPS satellites. It also includes a speaker 5, a microphone 6, and a voice processing section 7 for interfacing by voice to a user of the mobile station MS, a key manipulation section 8 for manipulation input, a display 9 for displaying various information to the user, a memory section 10 for storing data and a program, and a control section 11 for executing the program and controlling each section of the mobile station MS. Here, the CDMA antenna 1 and the GPS antenna 3 may be combined to one antenna unit. A touch-panel type of a display may be substituted for the key manipulation section 8.

Figure 3:
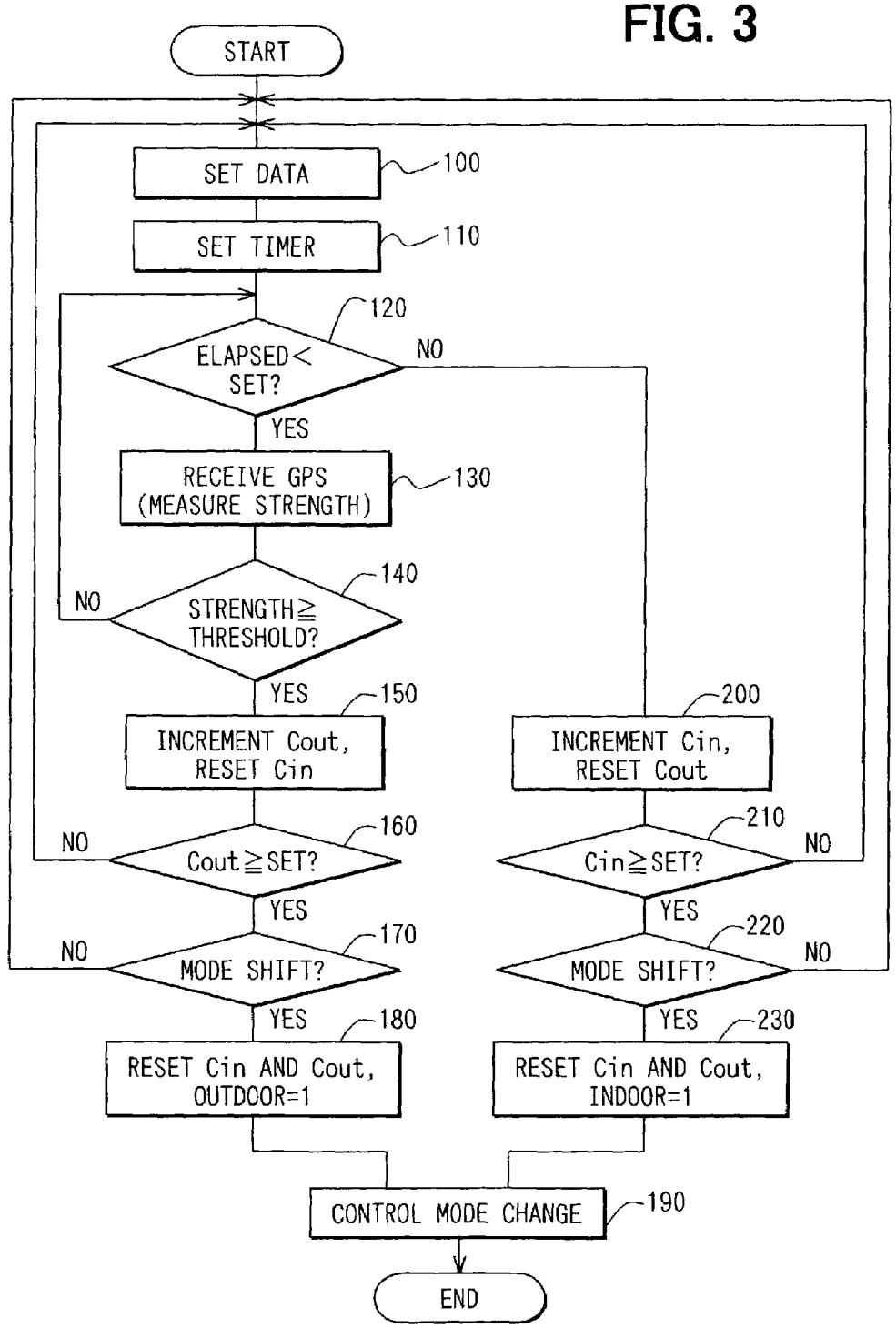
FIG. 3 is a flow diagram illustrating major steps for a computer to execute in the mobile station according to the embodiment.

Referring to FIG. 3, an executing procedure of the mobile station, particularly the control section 11, is explained. The control section automatically starts to execute the procedure of FIG. 3 when it is in an idle (communication waiting) state, independently of the procedure for the location computing by using the GPS signals.

At first, at step 100, as satellite reception data are set up for the reception of the GPS satellite, the GPS RF section 4 starts to await the GPS signals. The satellite reception data specifically indicates assistant information for the GPS satellite reception which is previously sent from the positioning server PSV. The assistant information for the GPS satellite reception is instructed to the mobile station MS by the positioning server PSV, and is used for the mobile station MS to receive the GPS signals necessary for the location computing in the positioning server PSV. The assistant information includes numbers and capture parameters of a plurality of the GPS satellites which should be received by the mobile station MS in the location where the mobile station is located. The mobile station constantly stores the assistant information for GPS satellite reception along with accordingly updating, independently of the procedure described in the flow diagram. At above step 100, the assistant information for the GPS satellite reception is appropriated.

Since a revolution cycle of the GPS satellite is twelve hours, the GPS satellite location observed from the same place on the earth considerably varies in tens of minutes or about an hour. Based on the old assistant information, the GPS signals may not be captured at all. Accordingly, when a predetermined period passes from the time in which the present assistant information is obtained, the most recent assistant information may be required to the positioning server PSV.

At step 110, a satellite reception timer is set, namely, a cyclic reception period for the GPS signal is set to, for instance, two seconds and the timer is started. At the same time, at step 120 the GPS RF section 4 starts to await the GPS signals and to observe whether elapsed time reaches the above preset time.

At step 130, until elapsed time reaches the preset time, namely the GPS reception period (for instance, two seconds described above), the reception strength is measured and the operation of the GPS RF section 4 is stopped if the GPS satellite is captured and the GPS signal is received. Then, at step 140, the measured reception strength of the GPS signal is compared with a preset threshold value. As just described, only presence of the GPS signal whose reception strength is higher than the predetermined strength, irrespective of time information and others included in the signal, is used to quickly and simply determine a mode of indoor or outdoor.

When the reception strength is lower than the threshold, the procedure returns to step 120 and the GPS signal is continuously awaited within the reception period. When the reception strength is more than the threshold, the procedure proceeds to step 150 and an outdoor counter Cout is incremented by one as an indoor counter Cin is reset to zero.

At step 160, whether the outdoor counter Cout reaches a specified value (for instance, three) is determined. When the counter does not reach it, the procedure returns to step 100 and the satellite reception data are set up to refresh them and the GPS signal is resumed to await it. When the counter reaches it, the procedure proceeds to step 170 and whether a mode shift is required is determined with checking state of an indoor flag and an outdoor flag. Namely, the mode determined previously is for indoors when the indoor flag is set to one, so that the mode shift is required and the procedure proceeds to 180. The mode determined previously is for outdoors when the outdoor flag is set to one, so that the mode shift is not required and the procedure returns to 100.

At step 180, the indoor and outdoor counters Cin and Cout are both reset. As the mode shifts to the outdoor, the outdoor flag is set to one and at step 190 interfaces are controlled for the outdoor mode.

Meanwhile, as it is determined that the elapsed time reaches the preset time without receiving the GPS signal at step 120, the procedure proceeds to step 200. At step 200, the indoor counter Cin is incremented by one and the outdoor counter Cout is reset to zero.

At step 210, whether the indoor counter Cin reaches a specified value (for instance, three) is determined. When the counter does not reach it, the procedure returns to step 100 and the satellite reception data are set up to refresh them and the GPS signal is resumed to await it. When the counter reaches it, the procedure proceeds to step 220 and whether a mode shift is required is determined with checking state of an indoor flag and an outdoor flag. Namely, the mode determined previously is for outdoors when the outdoor flag is set to one, so that the mode shift is required and the procedure proceeds to 230. The mode determined previously is for indoors when the indoor flag is set to one, so that the mode shift is not required and the procedure returns to 100.

At step 230, the indoor and outdoor counters Cin and Cout are both reset. As the mode shifts to indoor, the indoor flag is set to one and at step 190 interfaces are controlled for the indoor mode.

Figure 4:
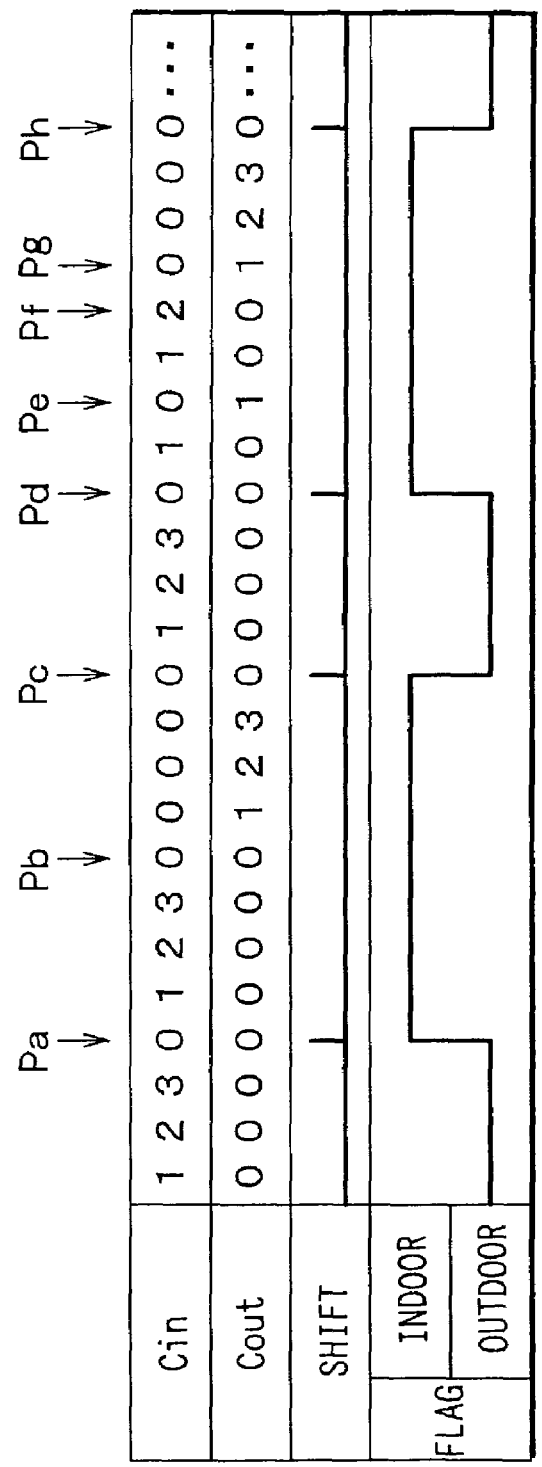
FIG. 4 is a diagram illustrating time-series behavior of indoor and outdoor counters and mode shift in the mobile station according to the embodiment.

Here, referring to FIG. 4, behavior of indoor and outdoor counters Cin and Cout and the mode shift at above steps 150~180 and 200~230 are explained. As described above, when the GPS signal is not received within the timer preset period, the indoor counter Cin is incremented and simultaneously the outdoor counter Cout is reset. On the contrast, when the GPS signal is received within the timer preset period, the outdoor counter Cout is incremented and simultaneously the indoor counter Cin is reset. Then, when each counter reaches the specified value, the mode is determined and necessity of the mode shift is determined depending on the mode previously determined.

At points Pa and Pd in FIG. 4, a mode shift of outdoor→indoor is generated since the indoor mode is determined during the outdoor mode period. Contrary, at points Pc and Ph, a mode shift of indoor→outdoor is generated since the outdoor mode is determined during the indoor mode period. However, at point Pb, a mode shift is not generated since the indoor mode is determined during the indoor mode period. In addition, at points Pe and Pg, after the indoor counter Cin is incremented and set to one or two, the outdoor counter Cout is incremented. Therefore, the indoor counter Cin is reset to zero and the mode does not shift. At point Pf, since the indoor counter Cin is incremented to two but remains less than three, the mode dose not shift.

As described above, in the embodiment of the present invention, whether the GPS signal is received within the timer preset period or not is counted as presence or absence. When the sum of the presence or the absence which continuously occurs reaches predetermined times (in above instance, three times), the mode shifts. Accordingly, even in the case that a mobile station MS user moves in and out between indoors and outdoors for a short period, the mode may not shift until usage condition of the mobile station becomes stable. As the result, unstable operation of the mobile station MS is prevented.

In the next place, station function control according to the mode shift at step 190 is explained. When a user interface is altered to the outdoor mode, functions are set to the outdoor mode setups, for instance, contrast and brightness of liquid crystal or electroluminescence used as the display 9 may be intensified, incoming and call volume may be made loud, a noise canceller circuit may be turned on, or parameter of a noise canceller may be set for outdoors. When the interface is altered to the indoor mode, the above functions are set to the indoor mode setups. In addition, these functions and setups may be set to the desired condition by the station user. Moreover, in the case of shifting to the indoor mode, "manner mode" which is previously fixed in the mobile station MS may be selected and the setups of the functions are altered in a lump.

In this way, a station interface is set to predetermined setups according to the mode of indoor or outdoor, so that a user may utilize the station interface which operates at predetermined setups at an actual usage such as calling or receiving a call.

At step 190, the station interface is controlled. Then, the procedure returns to step 100 and above procedure is repeated on the condition of no interruption due to call reception and others or no user's instruction of end. When the procedure is interrupted between step 100 and step 190, the above procedure is stopped and the procedure for interruption is prioritized.

Moreover, the reception timer set at step 110 may not be a fixed value but be a variable value according to situation. When the mode is previously determined to be indoor mode, the satellite reception is assumed to be difficult. In the case, the timer may be set to be longer, so that the presence or absence of the GPS signal reception is surely determined. Inversely, when the mode is previously determined to be outdoor, the timer may be set to be shorter as the GPS signal reception is assumed to be easy. In addition, when the reception strength of the GPS signal measured at step 130 is relatively high, the timer may be set to be shorter at step 110 as a plurality of the GPS satellites are assumed to be captured.

What is claimed is:

1. A mobile station which communicates via wireless line with a base station forming a communication network and which receives a GPS signal from a GPS satellite, said mobile station comprising:
   comparing means which compares reception strength of said GPS signal with a threshold to detect presence or absence of the GPS signal;
   determining means which determines a mode of indoor or outdoor according to the presence or the absence of the GPS signal;
   altering means which alters a setup of a mobile station interface according to said mode; and
   a satellite reception timer which sets a reception period of said GPS signal and sets a start of said reception period when said mode is determined,
   wherein said comparing means compares the reception strength of the GPS signal received at every said reception period.

2. A mobile station as claimed in claim 1, wherein said altering means alters said setup of the mobile station interface when said mode determined by said determining means changes from the mode previously determined.

3. A mobile station as claimed in claim 1, further comprising:
   counting means which counts continuous times of the presence or the absence according to detection of said comparing means,
   wherein said determining means determines said mode of indoor or outdoor when said continuous times reaches a specified value.

4. A mobile station as claimed in claim 1, further comprising:
   receiving means which receives assistant information from a positioning server arranged in said communication network; and
   searching means which searches said GPS satellite based on said assistant information,
   wherein said determining means determines said mode to be indoor when the GPS signal is not received although said searching means searches said GPS satellite based on said assistant information.

5. A mobile station as claimed in claim 4, wherein said searching means searches based on said assistant information previously received without receiving present assistant information each time said mode is determined.

6. A mobile station as claimed in claim 4, wherein said receiving means receives present assistant information to refresh when a predetermined period passes from time in which said assistant information is previously received.

7. A mobile station as claimed in claim 1, further comprising:
   fixing means which fixes said setup of the mobile station interface altered by said altering means according to said mode of indoor or outdoor.

8. A mobile station as claimed in claim 7, wherein said fixing means fixes said setup according to said mode of outdoor which indicates at least one of that contrast and brightness of a display of said mobile station is intensified, that volume of a speaker of said mobile station is made loud, and that a noise is cancelled.

9. A mobile station as claimed in claim 7, wherein said fixing means fixes said setup according to said mode of indoor which indicates the same setup according to a manner mode wherein the setup is previously fixed to prevent neighboring persons from being disturbed due to speaker volume of the mobile station.

10. A setup altering method for a mobile station which communicates via wireless line with a base station forming a communication network and which receives a GPS signal from a GPS satellite, said setup altering method comprising steps of:
    comparing reception strength of said GPS signal with a threshold to detect presence or absence of the GPS signal;
    determining a mode of indoor or outdoor according to the presence or the absence of the GPS signal;
    altering a setup of a mobile station interface according to said mode; and
    setting a reception period of said GPS signal and a start of said reception period when said mode is determined, and
    counting continuous times of the presence or the absence detected at said comparing step.

11. A setup altering method as claimed in claim 10, further comprising steps of:
    receiving assistant information from a positioning server arranged in said communication network; and
    searching said GPS satellite based on said assistant information.

12. A setup altering method as claimed in claim 10, further comprising a step of:
    fixing said setup of the mobile station interface according to said mode of indoor or outdoor.

* * * * *